May 8, 1945. A. F. WILD 2,375,714

BUTTER CONDITIONER

Filed Sept. 3, 1942

Inventor:
Albert F. Wild,
by Harry C. Dunham
His Attorney.

Patented May 8, 1945

2,375,714

UNITED STATES PATENT OFFICE 2,375,714

BUTTER CONDITIONER

Albert F. Wild, Scotia, N. Y., assignor to General Electric Company, a corporation of New York Application September 3, 1942, Serial No. 457,221

1 Claim. (Cl. 257—9)

My invention relates to food-storage receptacles and more particularly to such receptacles for use in refrigerator cabinets.

It is an object of my invention to provide a new and improved food-storage receptacle for refrigerator cabinets and the like.

Further objects and advantages of my invention will become apparent as the following description proceeds and the features of novelty which characterize my invention will be pointed out with particularity in the claim annexed to and forming a part of this specification.

Figure 1:
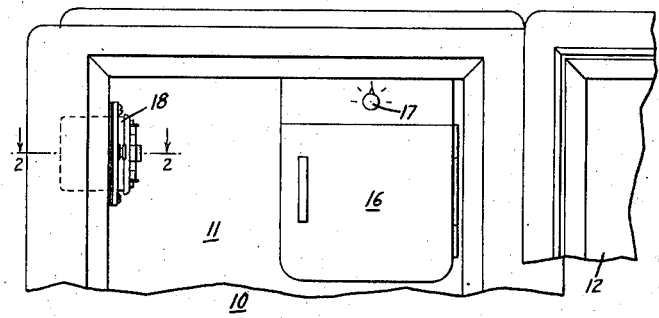
Figure 3:
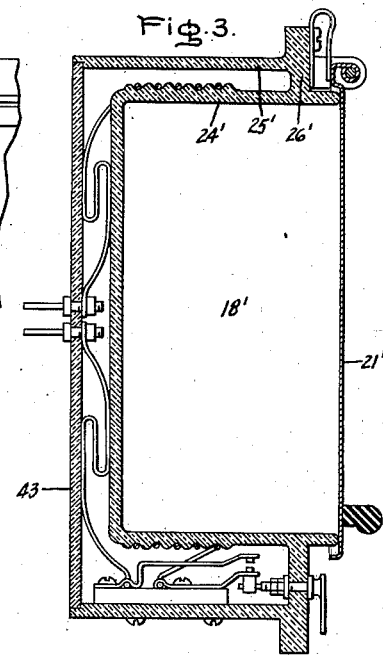
Figure 2:
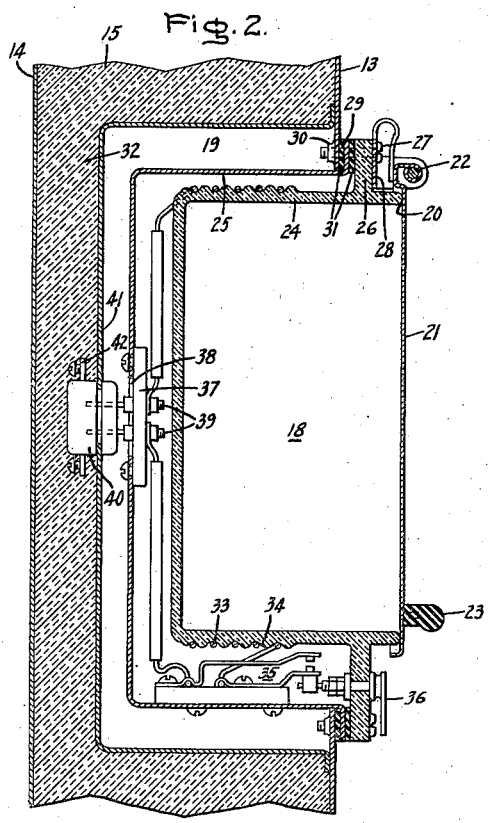
Figure 4:
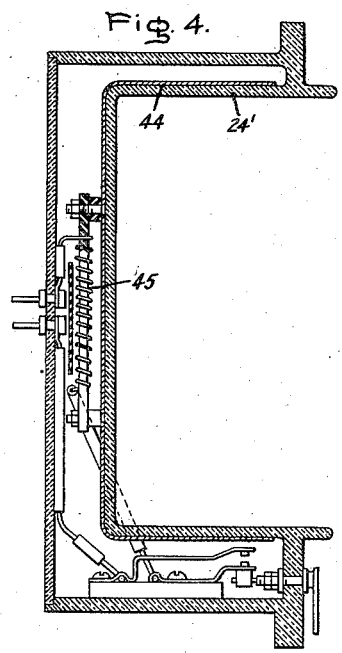

For a better understanding of my invention, reference may be had to the drawing in which Fig. 1 is a partial view of a refrigerator cabinet equipped with a butter conditioner or the like embodying the principles of my invention, and Figs. 2, 3, and 4 are enlarged sectional views of butter conditioners illustrating various embodiments of my invention, taken along the line 2—2 of Fig. 1.

In the drawing, there is illustrated a refrigerator cabinet 10 of the domestic type having a food-storage compartment 11 defined by suitable thermally insulated walls and a thermally insulated closure member 12. The walls of the cabinet may include an inner liner 13 and an outer casing 14, the space therebetween being filled with suitable thermal insulating material 15. In order to cool the food-storage compartment 11, there is provided a refrigerant evaporator 16 suitably disposed within the compartment 11. Inasmuch as the details of the refrigerating system form no part of my present invention, it is believed unnecessary to illustrate the complete system. Any desired apparatus may be employed for conducting gaseous refrigerant to the evaporator or cooling element 16. Suitable control means, as indicated by the numeral 17, may also be provided.

In the illustrated embodiments of my invention, a food-storage receptacle 18 is provided for the storage of food, such as butter and the like. Inasmuch as the food-storage compartment 11 is commonly run at a temperature of approximately forty to forty-five degrees F. and butter must be at a temperature of about sixty degrees F. or warmer before it can be easily spread, it is desirable to provide means for imparting heat to the interior of the receptacle 18. In the illustrated form of my invention, there is provided a recess 19 in the insulating material 15 into which the receptacle extends. It will be obvious that the rate of heat exchange through the thin layer of insulation next to the receptacle will be greater than that through the main body of insulation 15. In order to supplement the heat leakage through the cabinet wall, I have provided electric heating means. One wall of the receptacle 18 is provided with an opening 20 and a closure member 21 suitably hinged as indicated by the numeral 22 and provided with a handle member 23 for closing and opening the exposed side of the conditioner or receptacle 18. Disposition of the receptacle in the insulation space is advantageous because a minimum amount of food-storage space is occupied and a minimum amount of electric power is required to maintain the temperature of the receptacle at the desired value. However, if desired, the butter conditioner may be disposed in any convenient location within the refrigerated space.

In the embodiment of my invention shown in Fig. 2, there is shown an inner liner 24 defining the top, bottom, side, and rear walls of the receptacle, the remaining side comprising the door 21. The inner liner 24 is formed from a material having relatively low heat-conductivity characteristics, such as a ceramic material or glass. In order to provide additional insulation for the receptacle, there is provided an outer liner 25 of suitable material maintained in spaced relationship with respect to the inner liner by spacing means 26 of suitable material. Preferably, the spacing means 26 is made of a material having relatively low heat conductivity in nature and may conveniently be formed integrally with the inner liner 24. As is well understood, the inner and outer liners and spacing means are arranged to provide a layer of dead air which has relatively good heat-insulating characteristics. The liners and the spacing means may be assembled in any desired fashion as, for example, by means of a threaded fastening member 27 extending through a portion of the hinge 28 and suitable openings in the spacer 26, marginal flange 29 of the outer liner, and the inner liner 13 into engagement with a suitably located threaded projection 30 on the outer face of the inner liner 13. If desired, suitable sealing means 31 may be disposed between the spacing means and the flange and also between the flange and the inner liner of the cabinet.

As hitherto explained, an auxiliary source of heat in addition to that leaking through the thinned portion 32 of insulation is provided. In Fig. 2, the heating means takes the form of a coil of relatively high-resistance wire 33 wound about the sides, top, and bottom of the inner liner 24 and is distributed over a substantial portion of the outer surface of the inner liner. The heating coil may be secured in place in any desired fashion. For instance, grooves 34 may be molded in the outer surface of the inner liner 34 to receive the turns of the heating coil.

In order to permit adjustment of the temperature prevailing within the receptacle, a thermostatic device of any desired type may be employed, as indicated by the numeral 35, and suitable adjusting means 36 may be used for adjusting the temperature at which the thermostat will connect or disconnect an electric circuit to the heating coil.

Means is provided for completing an electric circuit to the heating coil and the thermostat. This means comprises a terminal block 37 which may be suitably secured across an opening 38 in the rear wall of the outer liner of the receptacle and terminals 39 suitably secured to the block and extending into a suitable socket 40 carried by the portion 41 of the inner liner 13 of the cabinet. The complete electric circuit is not illustrated because it will be readily understood that connections to a supply line will be made through the terminals 42 on the block 40 in such a way that the heating means and thermostat will be connected in a series circuit with the electric power source.

In Fig. 3, there is illustrated a second embodiment of my invention which is quite similar to the arrangement shown in Fig. 2 except that the inner liner 24', the outer liner 25', and the spacing means 26' of the receptacle 18' are all formed of a material having relatively low heat-conductivity characteristics and all but two of the walls of the conditioner are incorporated into one piece as by a molding process. A suitable ceramic may be employed and the material should be of the thermal-set type. A heat-set phenol-aldehyde resin is suitable for the purpose. One of the remaining walls, of course, is provided with an opening through which the food to be stored may be inserted and is closed by the door 21'. The outer liner of the remaining wall which forms a chamber about the inner liner is completed to constitute the chamber a dead air space by means of a back plate 43 of relatively low heat-conductivity material which is made removable to facilitate the assembly and, in case of need, the repair of the heating means.

The embodiment of my invention illustrated in Fig. 4 is similar to that illustrated in Fig. 3 except that a different means of imparting heat to the inner liner of the receptacle is provided. In this form of my invention, a substantial portion of the outer surface of the inner liner 24' is covered with a material having relatively good heat-conductivity characteristics as indicated by the numeral 44. Copper or aluminum is suitable for this purpose. An electric heating device 45 is suitably supported adjacent the covering 44 for imparting heat thereto, and, inasmuch as the material comprising the covering 44 conducts heat readily, there will be a relatively uniform distribution of heat over the sides, top, bottom, and rear walls of the receptacle 18'.

The above construction is advantageous in that the inner and outer liners or shells and the spacing means may be incorporated into one piece, thereby rendering assembly of the device and the installation of the receptacle into a refrigerator cabinet a very simple operation. Moreover, materials available for the inner liner provide a receptacle having an extremely sanitary and easily cleaned surface, and a very good degree of heat insulation is obtained, especially in the embodiments shown in Figs. 3 and 4 where a chamber of relatively dead air is enclosed between poor head conducting liners.

Heat loss to the compartment 11 may be minimized by using a door 21 of poor heat conductive material.

While I have shown particular embodiments of my invention, I do not desire my invention to be limited to the particular embodiments shown and described and I intend in the appended claim to cover all modifications within the spirit and scope of my invention.

What I claim as new and desire to secure by Letters Patent of the United States, is:

A food storage receptacle for storing butter and the like in refrigerated compartments at temperatures higher than the average normal temperature of the refrigerated compartment, comprising a one-piece wall structure formed of heat insulating material, said wall structure including an inner liner providing storage space open at one side and an outer liner spaced from said inner liner and forming a chamber about said inner liner and open on its side opposite the opening in said inner liner, a door for enclosing said storage space, a removable cover of insulating material for closing the open side of said outer liner to constitute said chamber a dead air space between said liners, a covering of heat conducting material arranged about and in good thermal contact with the outer surface of said inner liner, means arranged in said chamber in the space between said liners for heating a portion of said covering whereby said covering distributes heat over the surface of said inner liner, and means arranged within said chamber between said liners for controlling said heating means to determine the temperature within said receptacle.

ALBERT F. WILD.